United States Patent
Singh et al.

(10) Patent No.: US 12,321,823 B2
(45) Date of Patent: Jun. 3, 2025

(54) MACHINE LEARNING MODEL RETRAINING PIPELINE FOR ROBOTIC PROCESS AUTOMATION

(71) Applicant: UiPath, Inc., New York, NY (US)

(72) Inventors: Prabhdeep Singh, Bellevue, WA (US); Marco Alban Hidalgo, Redmond, WA (US); Anton McGonnell, Seattle, WA (US)

(73) Assignee: UiPath, Inc., New York, NY (US)

( * ) Notice: Subject to any disclaimer, the term of this patent is extended or adjusted under 35 U.S.C. 154(b) by 597 days.

(21) Appl. No.: 16/864,000

(22) Filed: Apr. 30, 2020

(65) Prior Publication Data

US 2021/0342736 A1 Nov. 4, 2021

(51) Int. Cl.
| G06F 15/16 | (2006.01) |
| B25J 9/16 | (2006.01) |
| G06F 9/54 | (2006.01) |
| G06N 5/02 | (2023.01) |
| G06N 20/00 | (2019.01) |
| H04L 29/06 | (2006.01) |

(52) U.S. Cl.
CPC .............. *G06N 20/00* (2019.01); *B25J 9/163* (2013.01); *G06N 5/02* (2013.01)

(58) Field of Classification Search
CPC ............. G06N 20/00; G06N 5/02; B25J 9/163
USPC ........................................................ 709/221
See application file for complete search history.

(56) References Cited

U.S. PATENT DOCUMENTS

| 7,792,353 | B2 | 9/2010 | Forman et al. |
| 9,555,544 | B2 * | 1/2017 | Bataller ................. B25J 9/1679 |
| 10,209,974 | B1 | 2/2019 | Patton et al. |
| 10,263,911 | B2 * | 4/2019 | Xiang ................... H04L 47/781 |
| 10,296,848 | B1 | 5/2019 | Mars et al. |
| 10,701,139 | B2 * | 6/2020 | Li ........................ H04L 41/0893 |
| 11,397,605 | B2 * | 7/2022 | Miyakoshi .......... H04L 43/0876 |
| 2005/0033709 | A1 | 2/2005 | Meng et al. |

(Continued)

FOREIGN PATENT DOCUMENTS

| EP | 3675008 A1 * | 7/2020 | .......... G06F 11/3438 |
| JP | H05189398 A | 7/1993 | |

(Continued)

OTHER PUBLICATIONS

Christoph Kading et al., "Fine-Tuning Deep Neural Networks in Continuous Learning Scenarios," ICIAP: International Conference on Image Analysis and Processing, 17th International Conference, Naples, Italy, Sep. 9-13, 2013, pp. 588-605 (retrieved on Mar. 16, 2017).

(Continued)

*Primary Examiner* — Hamza N Algibhah
(74) *Attorney, Agent, or Firm* — LeonardPatel PC; Michael A. Leonard, II; Sheetal S. Patel

(57) ABSTRACT

A machine learning (ML) model retraining pipeline for robotic process automation (RPA) is disclosed. When an ML model is deployed in a production or development environment, RPA robots send requests to the ML model when executing their workflows. When a confidence level of the ML model falls below a certain confidence, training data is collected, potentially from a large number of computing systems. The ML model is then trained using at least in part the collected training data, and a new version of the ML model is deployed.

20 Claims, 7 Drawing Sheets

(56) References Cited

U.S. PATENT DOCUMENTS

| | | | |
|---|---|---|---|
| 2015/0178638 A1 | 6/2015 | Deshpande et al. | |
| 2016/0105332 A1* | 4/2016 | Xiang | H04L 67/10 |
| | | | 709/226 |
| 2016/0212017 A1* | 7/2016 | Li | H04L 41/5048 |
| 2016/0381150 A1* | 12/2016 | Rajagopal | H04L 41/40 |
| | | | 709/223 |
| 2017/0144378 A1* | 5/2017 | Giera | G06N 20/20 |
| 2017/0185904 A1* | 6/2017 | Padmanabhan | G06N 5/04 |
| 2017/0228119 A1* | 8/2017 | Hosbettu | G06T 7/13 |
| 2017/0288971 A1* | 10/2017 | Jayaraman | H04L 41/5051 |
| 2018/0004563 A1* | 1/2018 | Miyazaki | G06F 9/5077 |
| 2018/0011730 A1* | 1/2018 | Zembutsu | H04L 41/0836 |
| 2018/0146031 A1* | 5/2018 | Li | H04L 41/5009 |
| 2018/0181424 A1* | 6/2018 | Gokurakuji | G06F 9/5077 |
| 2018/0322004 A1 | 11/2018 | Jain et al. | |
| 2019/0058670 A1* | 2/2019 | Zhu | H04L 12/6418 |
| 2019/0073447 A1 | 3/2019 | Guo et al. | |
| 2019/0089588 A1* | 3/2019 | Xu | H04L 49/253 |
| 2019/0089780 A1* | 3/2019 | Yousaf | G06F 9/45533 |
| 2019/0104182 A1* | 4/2019 | Elzur | H04L 67/125 |
| 2019/0108417 A1* | 4/2019 | Talagala | G06N 5/04 |
| 2019/0138938 A1 | 5/2019 | Vasseur et al. | |
| 2019/0332508 A1* | 10/2019 | Goyal | G06F 11/3414 |
| 2019/0363924 A1* | 11/2019 | Tse | G06F 9/5077 |
| 2019/0377984 A1* | 12/2019 | Ghanta | G06F 18/217 |
| 2020/0019882 A1 | 1/2020 | Garg et al. | |
| 2020/0057951 A1* | 2/2020 | Soni | G06F 8/34 |
| 2020/0065334 A1* | 2/2020 | Rodriguez | H04M 3/5183 |
| 2020/0111023 A1 | 4/2020 | Pondicherry et al. | |
| 2020/0134374 A1* | 4/2020 | Oros | G06F 8/71 |
| 2020/0206920 A1* | 7/2020 | Ma | G06F 18/23213 |
| 2020/0272283 A1* | 8/2020 | Sarin | G06N 20/10 |
| 2021/0019688 A1* | 1/2021 | Subramanian | G06Q 10/1053 |
| 2021/0042338 A1* | 2/2021 | Smutko | G06F 11/3438 |
| 2021/0107141 A1* | 4/2021 | Shrivastava | G06N 20/00 |
| 2021/0109722 A1* | 4/2021 | Ripa | G06F 9/45512 |
| 2021/0109834 A1* | 4/2021 | Singh | G06F 11/327 |
| 2021/0110207 A1* | 4/2021 | Singh | G06N 20/00 |
| 2021/0110300 A1* | 4/2021 | Singh | G06N 3/006 |
| 2021/0162592 A1* | 6/2021 | Han | B25J 9/163 |
| 2021/0192283 A1* | 6/2021 | Guo | G06F 18/2148 |
| 2021/0200560 A1* | 7/2021 | Munteanu | G06N 5/022 |
| 2021/0232966 A1* | 7/2021 | Elisha | G06F 16/906 |
| 2021/0256420 A1* | 8/2021 | Elisha | G06N 5/04 |
| 2021/0264307 A1* | 8/2021 | Higa | G06N 3/04 |
| 2021/0271809 A1* | 9/2021 | Huang | G06F 40/216 |
| 2021/0295231 A1* | 9/2021 | Cmielowski | G06N 20/00 |
| 2021/0312324 A1* | 10/2021 | Huang | G06F 18/2178 |
| 2021/0312365 A1* | 10/2021 | de Roode | G06F 11/302 |
| 2021/0376604 A1* | 12/2021 | Mathur | H02J 3/004 |
| 2021/0397157 A1* | 12/2021 | Cote | G06N 20/00 |
| 2022/0158910 A1* | 5/2022 | Santos | H04L 41/5009 |
| 2022/0225170 A1* | 7/2022 | Xia | H04L 41/0895 |
| 2022/0329495 A1* | 10/2022 | Xie | H04L 41/40 |
| 2023/0148302 A1* | 5/2023 | Ping | H04W 24/02 |
| | | | 370/254 |
| 2023/0217362 A1* | 7/2023 | Sharma | H04W 24/02 |
| | | | 370/329 |
| 2023/0261950 A1* | 8/2023 | Xie | H04L 41/342 |
| | | | 709/222 |

FOREIGN PATENT DOCUMENTS

| | | |
|---|---|---|
| JP | 2018094677 A | 6/2018 |
| JP | 2019171540 A | 10/2019 |
| KR | 1020190098859 A | 8/2019 |
| WO | 2020061699 A1 | 4/2020 |

OTHER PUBLICATIONS

European Search Report issued in EP Application No. 20199073 on Mar. 12, 2021.
Keze Wang et al., "Cost-Effective Active Learning for Deep Image Classification," IEEE Transactions on Circuits and Systems for Video Technology, arxiv.org XP080741268 (Jan. 13, 2017).
Syanan Sivaraman et al., "A General Active-Learning Framework for On-Road Vehicle Recognition and Tracking," IEEE Transactions on Intelligent Transportation Systems, vol. 11, No. 2, pp. 267-276 (Jun. 2010).
International Search Report and Written Opinion of the International Search Authority issued for PCT Application No. PCT/US2020/046962 on Jan. 12, 2021.
Office Action issued in Korean Application No. 10-2020-7028187 on Jul. 27, 2022.
Notice of Allowance issued in Korean Application No. 10-2020-7028187 on Jan. 25, 2023.
Examination Report issued in European Application No. 20199073.6 on Apr. 17, 2024.
Office Action, issued Mar. 21, 2025, CN Patent Application No. 202080002353.9.
Search Report, issued Mar. 21, 2025, CN Patent Application No. 202080002353.9.

* cited by examiner

MACHINE LEARNING MODEL RETRAINING PIPELINE FOR ROBOTIC PROCESS AUTOMATION

FIELD

The present invention generally relates to robotic process automation (RPA), and more specifically, to a machine learning (ML) model retraining pipeline for RPA.

BACKGROUND

Currently, no standard mechanism or process exists for automating a feedback loop to retrain an ML model. Accordingly, an improved solution may be beneficial.

SUMMARY

Certain embodiments of the present invention may provide solutions to the problems and needs in the art that have not yet been fully identified, appreciated, or solved by current RPA technologies. For example, some embodiments of the present invention pertain to an ML model retraining pipeline for RPA.

In an embodiment, a computer-implemented method for implementing an ML model retraining pipeline for RPA includes calling an ML model, by an RPA robot, and receiving a result from the execution of the ML model, by the RPA robot. The computer-implemented method also includes determining whether one or more trigger conditions are met for labeling of data for the ML model, by the RPA robot. When the one or more trigger conditions are met, the computer-implemented method further includes prompting a user to provide labeled data for training or retraining the ML model and sending the labeled data to a server for training or retraining of the ML model, by the RPA robot, or adding information pertaining to the result from the ML model to a queue for subsequent labeling, by the RPA robot.

In another embodiment, a computer-implemented method for implementing an ML model retraining pipeline for RPA includes determining whether one or more trigger conditions are met for labeling of data for the ML model, by the RPA robot. When the one or more trigger conditions are met, the computer-implemented method also includes prompting a user to provide labeled data for training or retraining the ML model and sending the labeled data to a server for training or retraining of the ML model, by the RPA robot, or adding information pertaining to the result from the ML model to a queue for subsequent labeling, by the RPA robot.

In yet another embodiment, a computer-implemented method for implementing an ML model retraining pipeline for RPA includes calling an ML model, by an RPA robot, and receiving a result from the execution of the ML model, by the RPA robot. The computer-implemented method also includes determining whether one or more trigger conditions are met for labeling of data for the ML model, by the RPA robot. When the one or more trigger conditions are met, the computer-implemented method further includes prompting a user to provide labeled data for training or retraining the ML model and sending the labeled data to a server for training or retraining of the ML model, by the RPA robot, or adding information pertaining to the result from the ML model to a queue for subsequent labeling, by the RPA robot. When one or more training criteria are met, the computer-implemented method additionally includes training the ML model, by the server, using the labeled data to produce a new version of the ML model and deploying the new version of the ML model, by the server.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
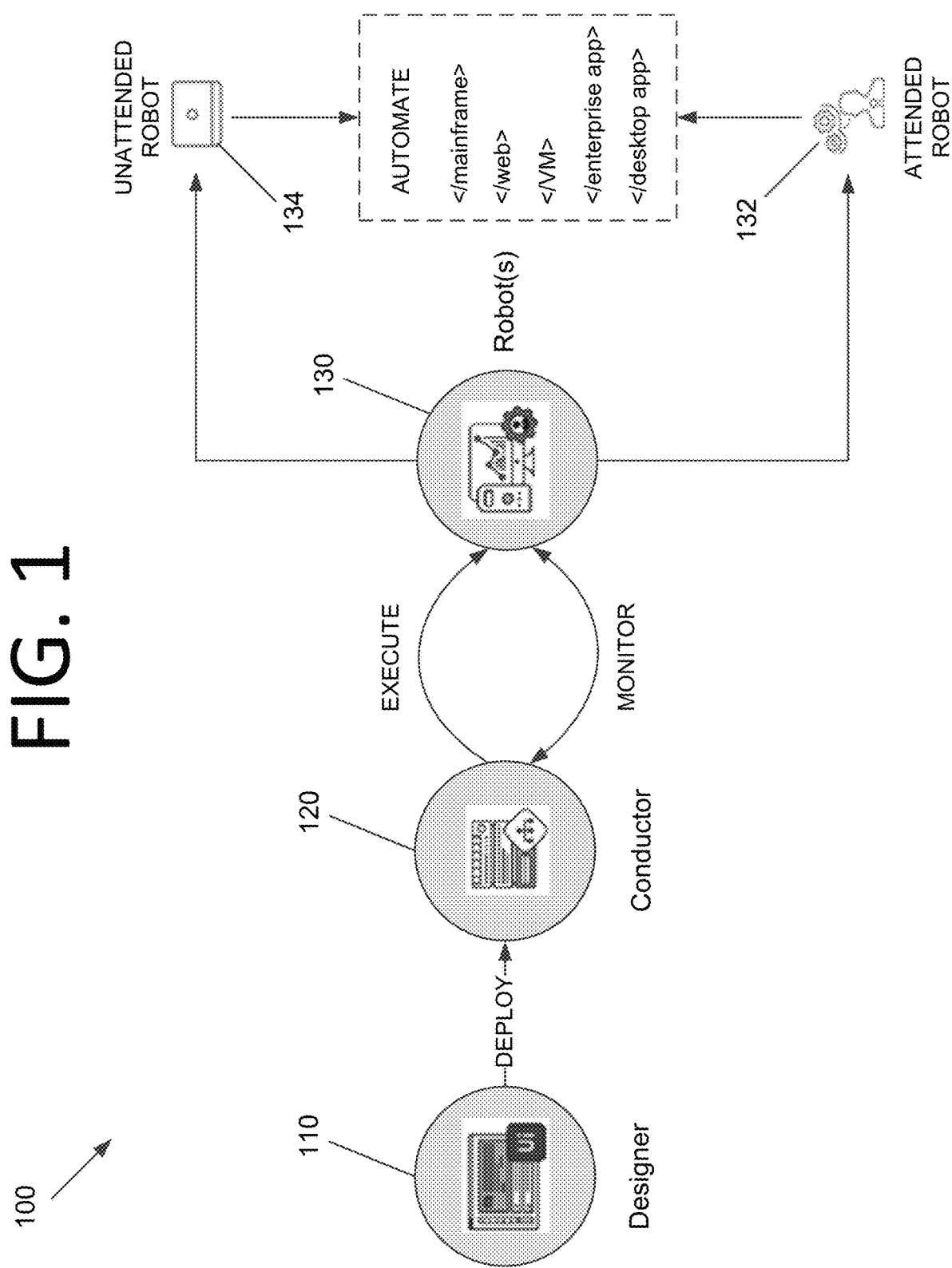
FIG. 1 is an architectural diagram illustrating an RPA system, according to an embodiment of the present invention.

Some embodiments pertain to an ML model retraining pipeline for RPA. When an ML model is deployed in a production (i.e., runtime) or a development environment, RPA robots may send requests to the ML model when executing their workflows. However, ML model performance may degrade over time and/or may otherwise deviate from desired performance characteristics as various conditions change. For example, consider the case where an RPA robot calls an ML model that is trained to identify dogs. The ML model initially has a confidence threshold of 99%, but as the ML model is used more widely on more dog images and new breeds, the confidence threshold falls to 95%.

Some embodiments employ one or more triggers to initiate the collection of labeled data for retraining. Triggers may include, but are not limited to, ML model performance falling below a confidence threshold, ML model results deviating from a statistical distribution (e.g., ML model predictions no longer falling within a normal distribution with respect to a pool of users), ML model results that fall outside of a previously observed range, a human user (e.g., an RPA developer) noticing undesirable performance characteristics and initiating collection of labeled data for retraining, and/or any other suitable trigger without deviating from the scope of the invention. Unlike deterministic logic, where there is always a concrete logical path that can provide "exceptions," for probabilistic ML models, other types of mechanisms should be employed.

When to trigger labeled data collection (i.e., a "human-in-the-loop") is thus trigger-based in some embodiments. Returning to the example above of an ML model that identifies dogs, when the confidence threshold falls below 95%, a human user may be asked for input. For instance, the human user of the computing system on which the RPA robot is executing may be presented with an interface or option to make a correction. For instance, the human user could review the identification made by the ML model (e.g., "not dog") and make a correction if the identification is wrong. The incorrect image and the user's correction can be sent to a server (e.g., a cloud-based system, a data center, a company server, server(s) of an RPA provider, etc.) as training data, and the RPA robot can proceed with the execution of the remainder of its workflow.

Some embodiments may be employed for attended or unattended robots. In the context of attended automation, humans may label data and work alongside the RPA robot. Consider an attended RPA robot that runs in the background and classifies contract clauses for a lawyer. When retraining is triggered, the lawyer may be prompted to select the type of a clause and that classification could become part of the labeled data for retraining. As such, labeling for ML models called by attended RPA robots may be synchronous in some embodiments.

In the context of unattended automation, an RPA robot may send a request to the ML model, which returns a prediction and a confidence of that prediction. The unattended RPA robot can then evaluate whether the confidence threshold and/or some other criterion/criteria is met. If not, the unattended RPA robot could add the labeling task to a task queue for a user to perform later. Thus, labeling for ML models called by unattended RPA robots may be asynchronous in some embodiments.

The server may receive and store training data from various users. Over time, a batch of labeled training data is thus collected. When a predetermined time period elapses, a predetermined amount of training data is received, a predetermined number of training data samples is received, the data falls outside of some distribution of data (e.g., a normal distribution, a binomial distribution, or any other statistical distribution), a custom criterion or criteria, any combination thereof, etc., the ML model may be trained or retrained using the collected training data. The training may occur only using the collected training data or using the collected training data with previous training data used to train the current version of the ML model. Once trained or retrained, the new version of the ML model is then deployed, potentially without human action.

In some embodiments, the new version of the ML model may simply replace the previous version and calls to the ML model from RPA robot workflows may call the new version of the ML model instead. In certain embodiments, the new version of the ML model may be pushed out to computing systems of users of the RPA robots. In some embodiments, the workflows of the RPA robots may be modified to call the new version of the ML model. In certain embodiments, the RPA robots may try the new version of the ML model first, and if a certain confidence is not realized, try the previous version of the ML model to see whether the previous version achieves a higher confidence. In some embodiments, the RPA robots may call both versions of the ML model and select the output from the model with the highest confidence.

Some embodiments provide a framework for ML model supervision with a standard mechanism for humans to correct ML model predictions to improve accuracy. In certain embodiments, the user may not be aware that labeled data is being captured for training/retraining. This standard framework may be used to collect training data and improve ML model accuracy for various business processes without requiring programming knowledge in some embodiments.

The situations and timing of sample collection is ML model-dependent in some embodiments. A business or technical decision can be made regarding acceptable confidence thresholds if they are used for the ML model. If false negatives are very detrimental, such as in medical diagnoses, vehicle control models, etc. the threshold may be high (e.g., 99.9%, 99.9999%, etc.). If transaction speed is important, a higher error rate may be acceptable (e.g., 75%, 85%, 90%, 95%, etc.). If false positives are more acceptable than false negatives, or vice versa, this may also influence what conditions would make training or retraining of an ML model desirable.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
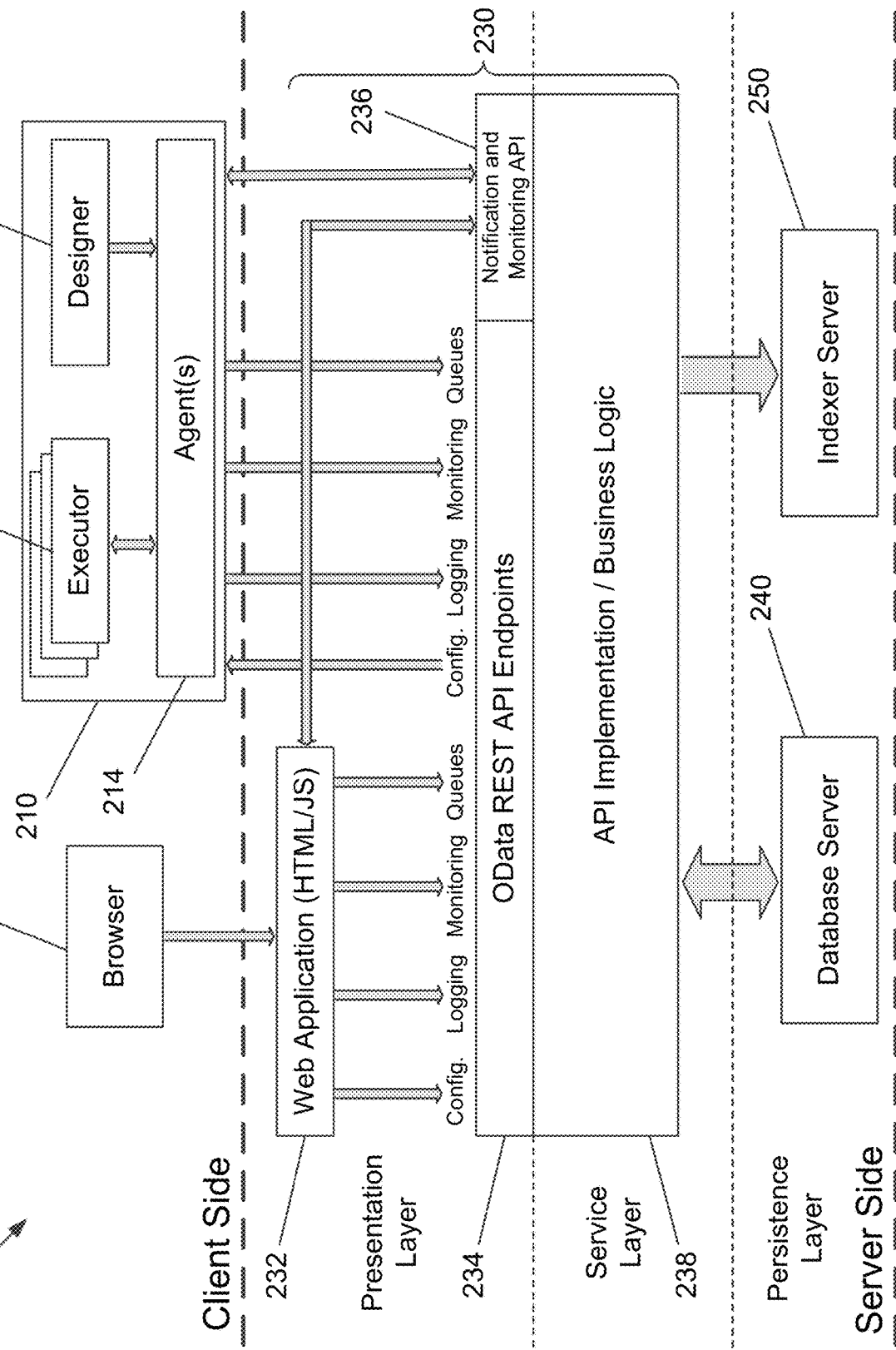
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch, which is an open source project full-text search engine. Messages logged by robots (e.g., using activities like log message or write line) may be sent through the logging REST endpoint (s) to indexer server 250, where they are indexed for future utilization.

Figure 3:
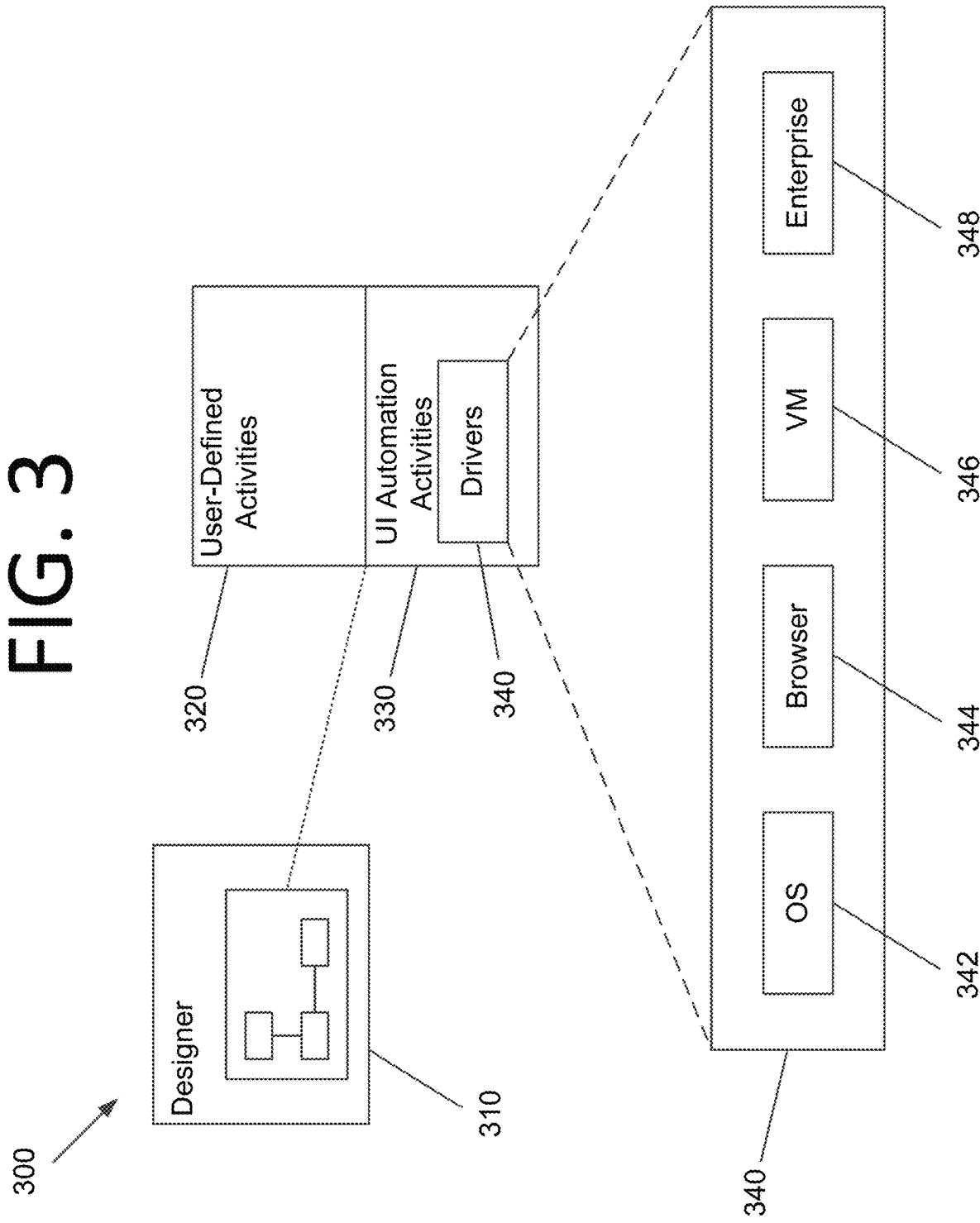
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
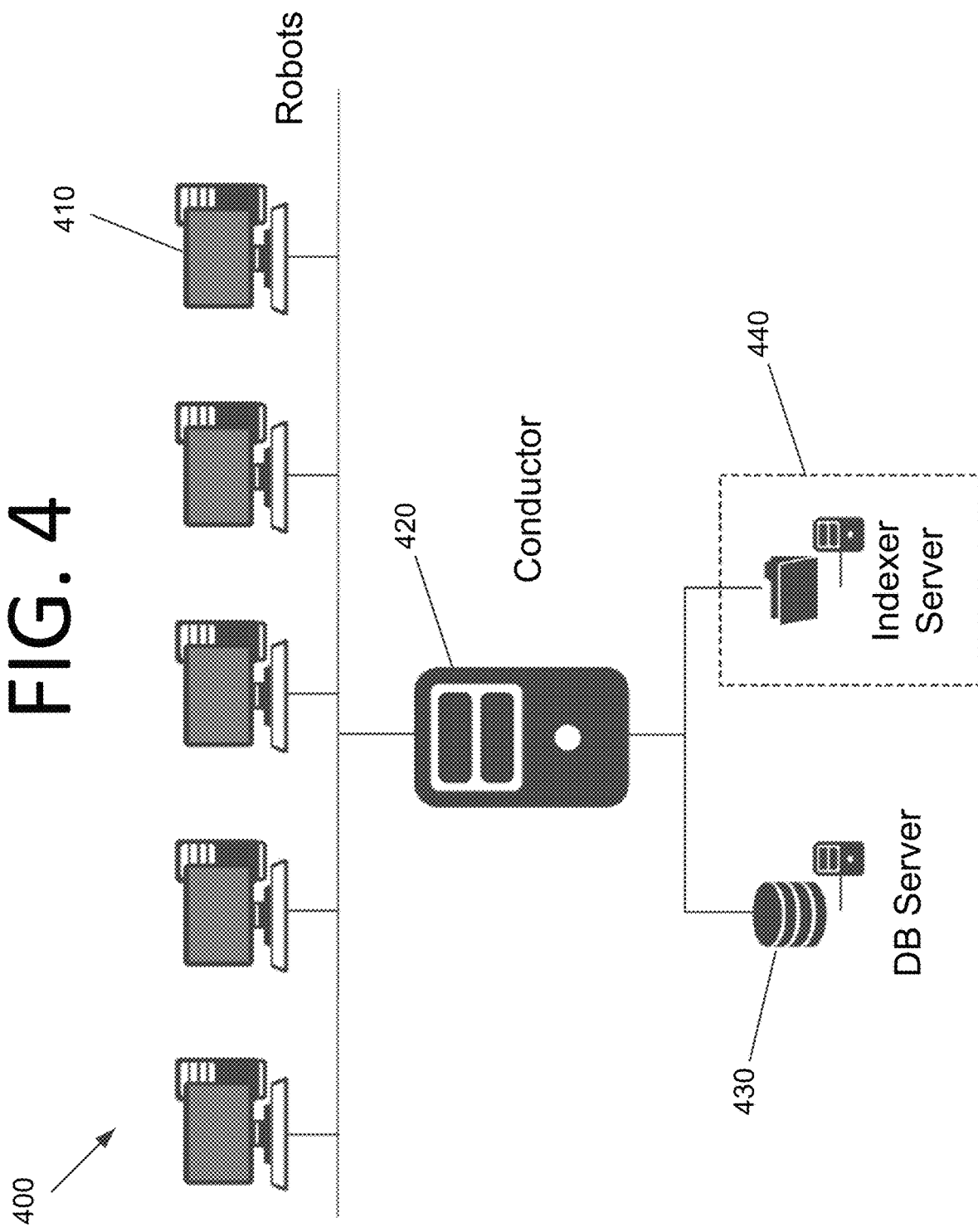
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
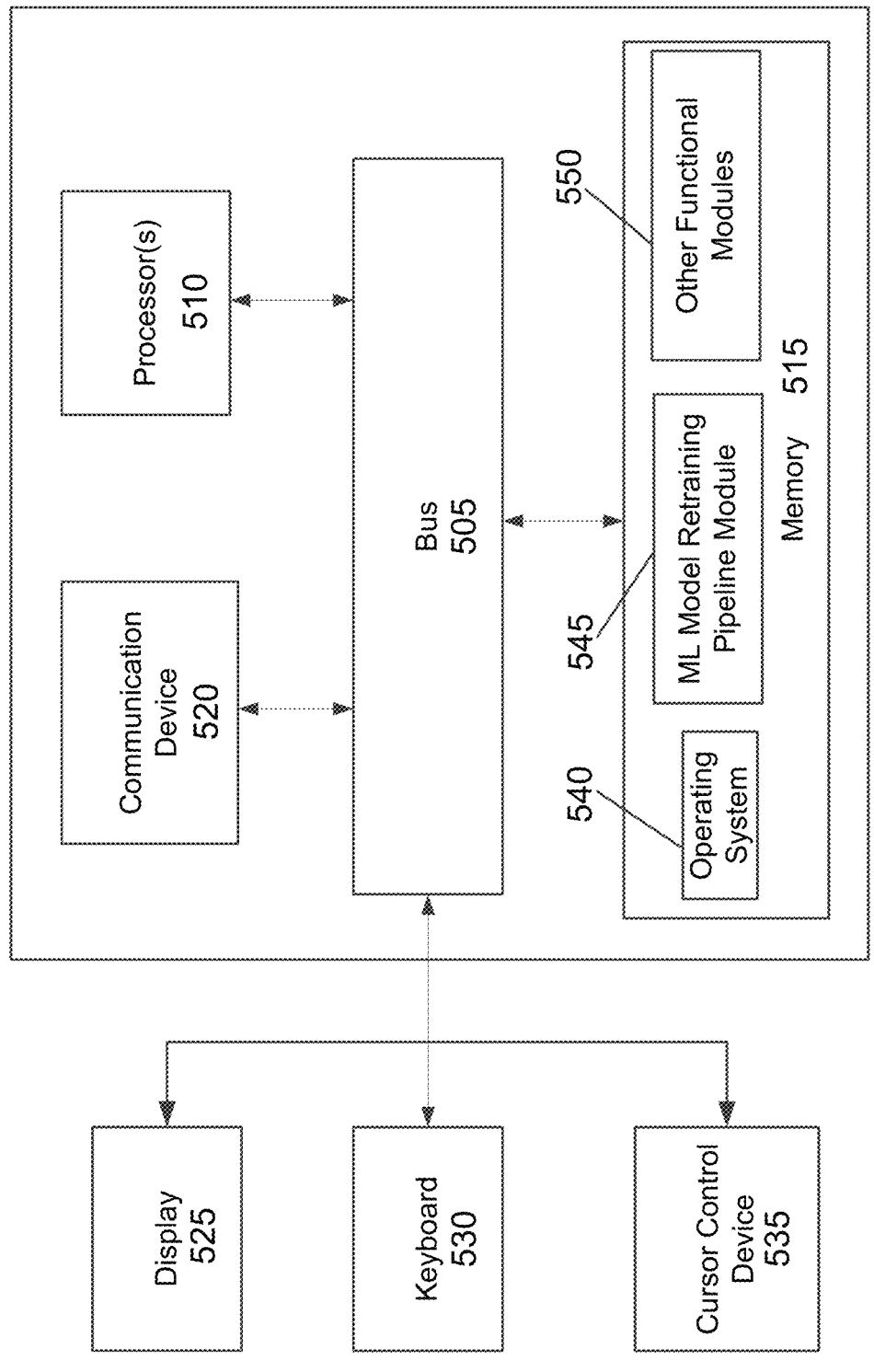
FIG. 5 is an architectural diagram illustrating a computing system configured to implement part of an ML model retraining pipeline for RPA, according to an embodiment of the present invention.

FIG. 5 is an architectural diagram illustrating a computing system 500 configured to implement part of an ML model retraining pipeline for RPA, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and/or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include ML model retraining pipeline module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
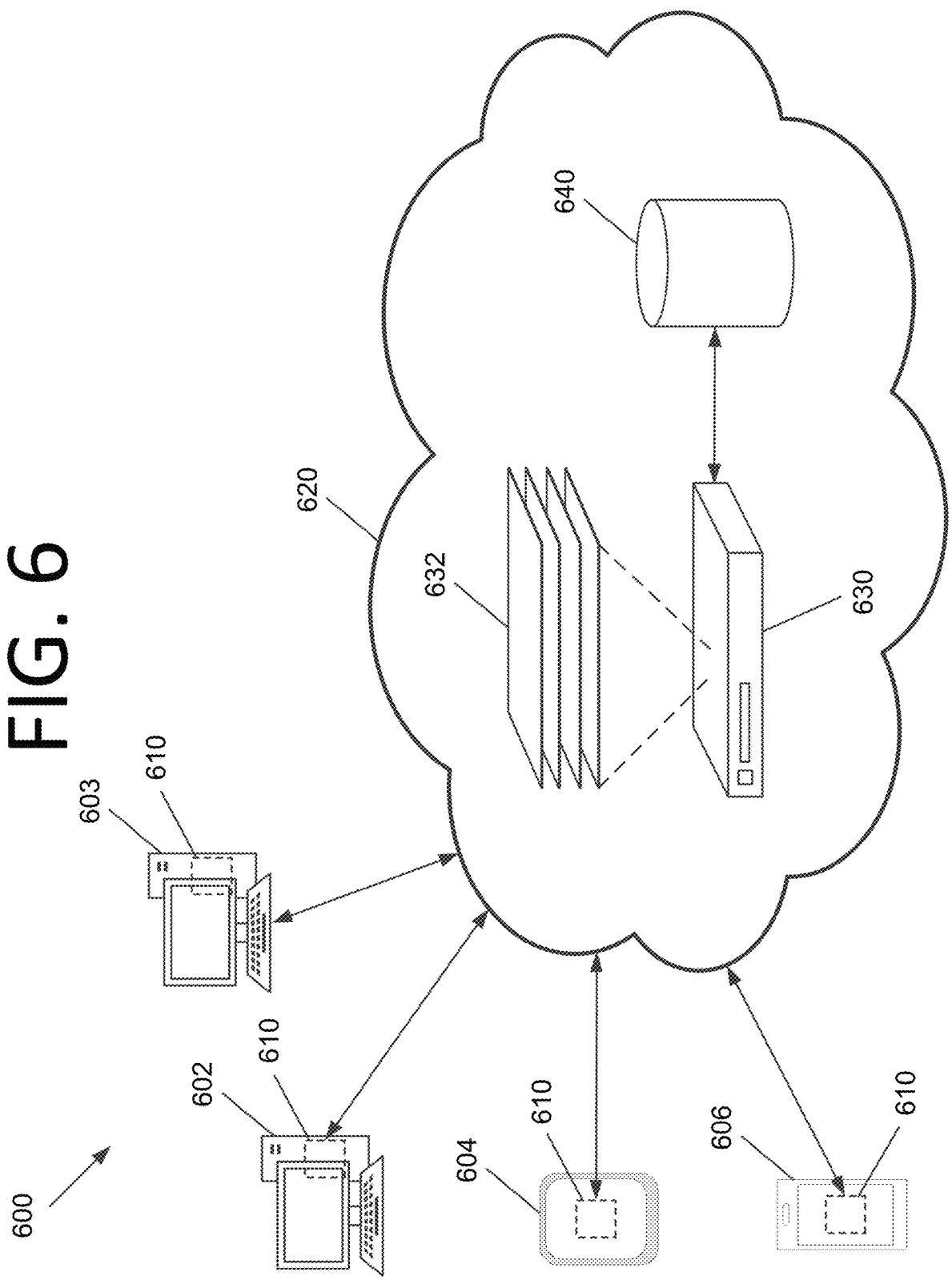
FIG. 6 is an architectural diagram illustrating a system configured to implement an ML model retraining pipeline for RPA, according to an embodiment of the present invention.

FIG. 6 is an architectural diagram illustrating a system 600 configured to implement an ML model retraining pipeline for RPA, according to an embodiment of the present invention. System 600 includes user computing systems, such as desktop computers 602, 603, tablet 604, and smart phone 606. However, any desired computing system may be used without deviating from the scope of invention including, but not limited to, smart watches, laptop computers, Internet-of-Things (IoT) devices, vehicle computing systems, etc. Also, which four user computing systems are shown in FIG. 6, any suitable number of computing systems may be used without deviating from the scope of the invention. For instance, in some embodiments, dozens, hundreds, thousands, or millions of computing systems may be used.

Each computing system 602, 603, 604, 606 has a digital process 610 running thereon that calls and/or executes an ML model. Digital processes 610 may be robots generated via an RPA designer application, be part of an operating system, be a downloadable application for a personal computer (PC) or smart phone, or be any other software and/or hardware without deviating from the scope of the invention. Indeed, in some embodiments, the logic of one or more of digital processes 610 is implemented partially or completely via physical hardware. Digital processes 610 may collect and send training data for training/retraining the ML model responsive to a trigger. Triggers may include, but are not limited to, ML model performance falling below a confidence threshold, ML model results deviating from a statistical distribution (e.g., ML model predictions no longer falling within a normal distribution with respect to a pool of users), ML model results that fall outside of a previously observed range, a human user (e.g., an RPA developer) noticing undesirable performance characteristics and initiating collection of labeled data for retraining, and/or any other suitable trigger without deviating from the scope of the invention.

Digital processes 610 send training data collected from users of their respective computing systems via a network 620 (e.g., a local area network (LAN), a mobile communications network, a satellite communications network, the Internet, any combination thereof, etc.) to a server 630. Server 630 stores the training data in a database 640. The training data may include, but is not limited to, images and user corrections (e.g., a region where the component is located on the screen, a text description from the user regarding an error, a label for the region, etc.).

When instructed by a human user (e.g., an RPA engineer or a data scientist), when a predetermined amount of training data has been collected, when a predetermined amount of time has passed since the last training, when a training request is received, etc., server 630 runs the training data through multiple AI layers 632. AI layers 632 process the data and generate a new version of the ML model. AI layers 632 may perform statistical modeling (e.g., hidden Markov models (HMMs)) and utilize deep learning techniques (e.g., long short term memory (LSTM) deep learning, encoding of previous hidden states, etc.).

In some embodiments, each AI layer 632 is an algorithm (or model) that runs on the training data, and the ML models themselves may be deep learning neural networks (DLNNs) of trained artificial "neurons" that are trained in training data. Layers may be run in series, in parallel, or a combination thereof. AI layers 632 may include, but are not limited to, a sequence extraction layer, a clustering detection layer, a visual component detection layer, a text recognition layer (e.g., OCR), an audio-to-text translation layer, multiple instances of one or more types of layers, or any combination thereof. Any desired number and type(s) of layers may be used without deviating from the scope of the invention. Using multiple layers may allow the system to develop a global picture of what is happening in a screen or process. For example, one AI layer could perform OCR, another could detect buttons, etc. Patterns may be determined individually by an AI layer or collectively by multiple AI layers.

In certain embodiments, a data scientist may initiate and/or monitor training of the ML model. For instance, the data scientist may supplement the training dataset with additional data, train the ML model again using different or supplemented training data if the newly trained ML model fails to achieve a desired confidence, etc. The data scientist may generate an update notification when the ML model is ready and approved in some embodiments. In certain embodiments, server 630 may generate the notification.

After the new version of the ML model is properly trained, server 630 may save the new version of the ML model in database 640, potentially replacing the previous version of the ML model. When the ML model is called from user computing systems 602, 603, 604, 606, the new version of the ML model is executed. In certain embodiments, the new version of the ML model may be pushed out to computing systems 602, 603, 604, 606. In some embodiments, the workflows of RPA robots calling the ML model may be modified to call the new version of the ML model. In certain embodiments, the RPA robots may try the new version of the ML model first, and if a certain confidence threshold is not met, try the previous version of the ML model to see whether the previous version achieves a higher confidence for a given scenario. In some embodiments, the RPA robots may call both versions of the ML model and select the output from the model with the highest confidence.

Figure 7:
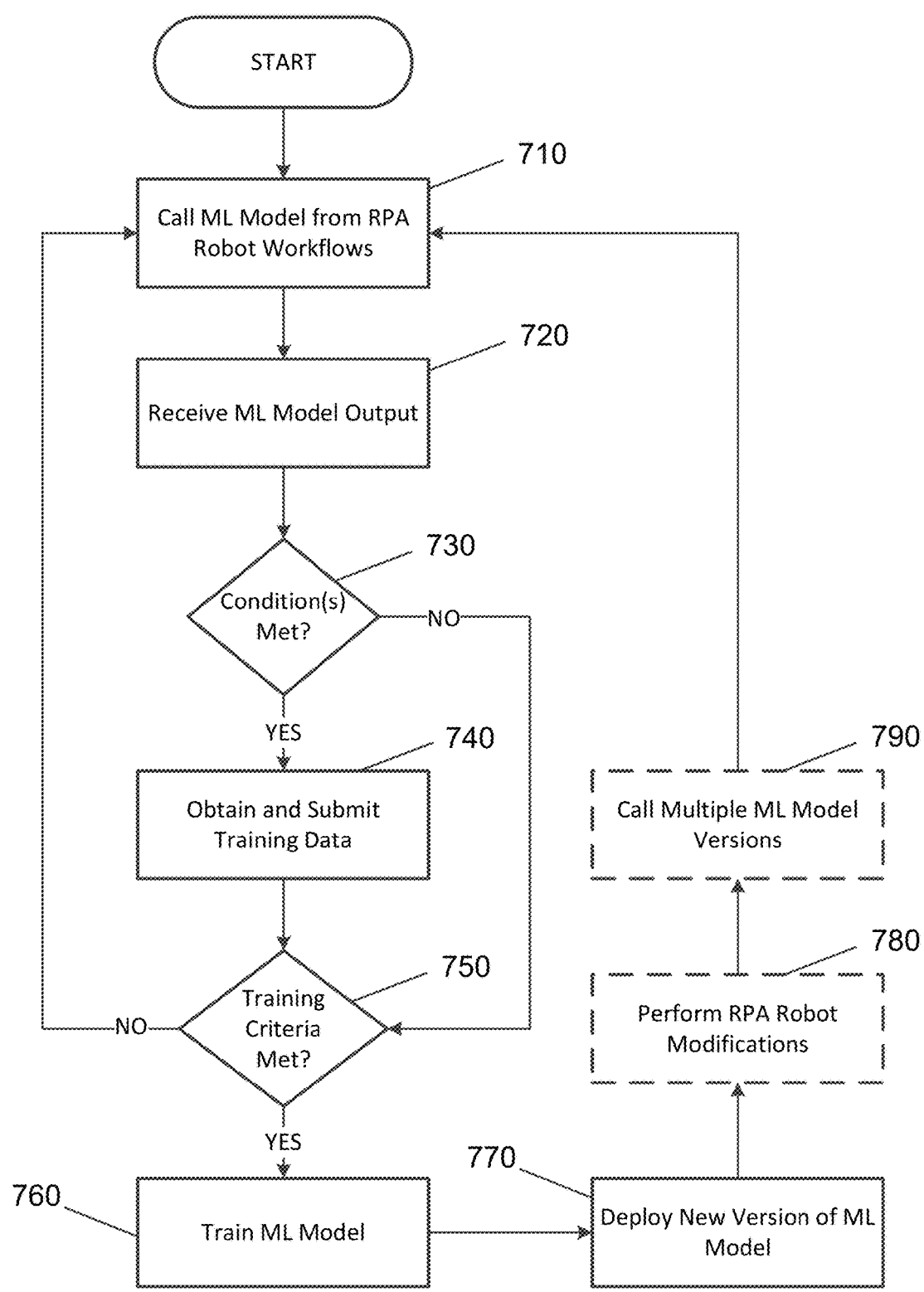
FIG. 7 is a flowchart illustrating a process for an ML model retraining pipeline for RPA, according to an embodiment of the present invention.

FIG. 7 is a flowchart illustrating a process 700 for an ML model retraining pipeline for RPA, according to an embodiment of the present invention. The process begins with calling an ML model from RPA robot workflows executing on user computing systems at 710. The RPA robot receives output from the ML model at 720 (e.g., a prediction and a confidence threshold, a variable and a statistical distribution, etc.) and determines whether one or more trigger conditions are met at 730. Trigger conditions may include, but are not limited to, ML model performance falling below a confidence threshold, ML model results deviating from a statistical distribution (e.g., ML model predictions no longer falling within a normal distribution with respect to a pool of users), ML model results that fall outside of a previously observed range, a human user (e.g., an RPA developer) noticing undesirable performance characteristics and initiating collection of labeled data for retraining, and/or any other suitable trigger without deviating from the scope of the invention.

If the trigger condition(s) are met at 730, labeled training data is obtained and submitted to a server at 740. For instance, for attended RPA robots, a human user of a computing system on which the RPA robot is executing may be presented with an interface or option to make a correction or human user of another computing system may be provided with information as to where the identification below the confidence threshold occurred and presented with an interface or option to make a correction. For unattended RPA robots, a screenshot may be automatically taken and coordinates may be provided of a given component on the screen to which the ML model was applied. This information may then be added to a queue for subsequent review and labeling.

When one or more training criteria are met at 750, the ML model is trained at 760 using the collected training data or using the collected training data with previous training data used to train the current version of the ML model. The one or more training criteria may include, but are not limited to, when a predetermined time period elapses, a predetermined amount of training data is received, a predetermined number of training data samples is received, the data falls outside of some distribution of data (e.g., a normal distribution, a binomial distribution, or any other statistical distribution), a custom criterion or criteria, any combination thereof, etc. In some embodiments, the training criteria are checked for in a separate process that is not linked to the other steps shown in FIG. 7.

After training, the new version of the ML model is deployed at 770. In some embodiments, the new version of the ML model may simply replace the previous version and calls to the ML model from RPA robot workflows may call the new version of the ML model instead without further modification. However, in some embodiments, further modifications are made so the RPA robot can interact with the new version of the ML model at 780. For instance, in certain embodiments, the new version of the ML model may be pushed out to computing systems of users of the RPA robots. In some embodiments, the workflows of the RPA robots may be modified to call the new version of the ML model.

In some embodiments, multiple versions of the ML model may be called by the RPA robots at 790. For instance, in certain embodiments, the RPA robots may try the new version of the ML model first, and if a certain confidence is not realized, try one or more previous versions of the ML model to see whether the previous version(s) achieve a higher confidence or otherwise achieve better results (e.g., better conformity with a statistical distribution, values that fall within a range, faster execution, etc.). In some embodiments, the RPA robots may call multiple versions of the ML model (e.g., the new version of the ML model and one or more previous versions of the ML model) and select the output from the model with the highest confidence or otherwise better results.

The process steps performed in FIG. 7 may be performed by a computer program, encoding instructions for the processor(s) to perform at least part of the process(es) described in FIG. 7, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for implementing a machine learning (ML) model retraining pipeline for robotic process automation (RPA), comprising:
    calling a machine learning (ML) model, by an RPA robot, while executing an activity of an RPA workflow that uses the ML model;
    receiving a result from the execution of the ML model, by the RPA robot;
    completing execution of the activity of the ROA RPA workflow using the result from the execution of the ML model, by the RPA robot;
    determining whether one or more trigger conditions are met for labeling of data for the ML model, by the RPA robot; and
    responsive to the one or more trigger conditions being met:
    prompting a user to provide labeled data for training or retraining the ML model and sending the labeled data to a server for training or retraining of the ML model, by the RPA robot, or adding information pertaining to the result from the ML model to a queue for subsequent labeling, by the RPA robot, wherein
    the RPA workflow comprises a plurality of activities that comprise the one or more activities, and
    the activities are a set of steps developed in the workflow.

2. The computer-implemented method of claim 1, wherein the one or more trigger conditions comprise ML model performance falling below a confidence threshold, ML model results deviating from a statistical distribution, ML model results that fall outside of a previously observed range, or any combination thereof.

3. The computer-implemented method of claim 1, wherein the one or more trigger conditions comprise receipt of an initiation command for collection of the labeled data.

4. The computer-implemented method of claim 1, further comprising: receiving the labeled data, by the server; and storing the labeled data in a database, by the server.

5. The computer-implemented method of claim 1, further comprising: responsive to one or more training criteria being met, training the ML model, by the server, using the labeled data to produce a new version of the ML model; and deploying the new version of the ML model, by the server.

6. The computer-implemented method of claim 5, wherein the training of the ML model additionally comprises using previous training data that was used to train a version of the ML model trained prior to the new version of the ML model.

7. The computer-implemented method of claim 5, wherein the one or more training criteria comprise a predetermined time period elapsing, a predetermined amount of training data being received, a predetermined number of training data samples being received, the data falling outside of a distribution of data, or any combination thereof.

8. The computer-implemented method of claim 5, wherein the new version of the ML model replaces a previous version of the ML model.

9. The computer-implemented method of claim 5, further comprising: modifying a workflow of the RPA robot to call the new version of the ML model.

10. The computer-implemented method of claim 5, further comprising: modifying a workflow of the RPA robot to call multiple versions of the ML model, the multiple versions comprising the new version of the ML model.

11. The computer-implemented method of claim 10, further comprising: calling the new version of the ML model, by the RPA robot; and responsive to the one or more trigger conditions not being met, calling a previous version of the ML model and selecting a best result from the current version of the ML model and the previous version of the ML model, by the RPA robot.

12. The computer-implemented method of claim 10, further comprising: calling the new version of the ML model and at least one previous version of the ML model, by the RPA robot; and selecting a best result from the current version of the ML model and the at least one previous version of the ML model, by the RPA robot.

13. The computer-implemented method of claim 1, wherein collection of the labeled data and training of the new version of the ML model is uniform for a plurality of ML models called by a plurality of RPA robots.

14. A computer-implemented method for implementing a machine learning (ML) model retraining pipeline for robotic process automation (RPA), comprising: determining whether one or more trigger conditions are met for labeling of data for an ML model, by an RPA robot, the RPA robot configured to call a machine learning (ML) model, by an RPA robot, responsive to the RPA robot executing an activity of an RPA workflow that uses the ML model; and
    responsive to the one or more trigger conditions being met:
    prompting a user to provide labeled data for training or retraining the ML model and sending the labeled data to a server for training or retraining of the ML model, by the RPA robot, or adding information pertaining to the result from the ML model to a queue for subsequent labeling, by the RPA robot, wherein
    the RPA workflow comprises a plurality of activities that comprise the one or more activities, and
    the activities are a set of steps developed in the workflow.

15. The computer-implemented method of claim 14, wherein the one or more trigger conditions comprise ML model performance falling below a confidence threshold, ML model results deviating from a statistical distribution, ML model results that fall outside of a previously observed range, or any combination thereof.

16. The computer-implemented method of claim 14, further comprising: responsive to one or more training criteria being met, training the ML model, by the server, using the labeled data to produce a new version of the ML model; and deploying the new version of the ML model, by the server.

17. The computer-implemented method of claim 16, wherein the one or more training criteria comprise a predetermined time period elapsing, a predetermined amount of training data being received, a predetermined number of training data samples being received, the data falling outside of a distribution of data, or any combination thereof.

18. The computer-implemented method of claim 16, further comprising: modifying a workflow of the RPA robot to call multiple versions of the ML model, the multiple versions comprising the new version of the ML model.

19. A computer-implemented method for implementing a machine learning (ML) model retraining pipeline for robotic process automation (RPA), comprising:
    calling a machine learning (ML) model, by an RPA robot, while executing an activity of an RPA workflow that uses the ML model;

receiving a result from the execution of the ML model, by the RPA robot;
completing execution of the activity of the RPA workflow using the result from the execution of the ML model, by the RPA robot;
determining whether one or more trigger conditions are met for labeling of data for the ML model, by the RPA robot; responsive to the one or more trigger conditions being met:
prompting a user to provide labeled data for training or retraining the ML model and sending the labeled data to a server for training or retraining of the ML model, by the RPA robot, or adding information pertaining to the result from the ML model to a queue for subsequent labeling, by the RPA robot;
responsive to one or more training criteria being met, training the ML model, by the server, using the labeled data to produce a new version of the ML model; and
deploying the new version of the ML model, by the server, wherein
the RPA workflow comprises a plurality of activities that comprise the one or more activities, and
the activities are a set of steps developed in the workflow.

20. The computer-implemented method of claim 19, wherein the one or more trigger conditions comprise ML model performance falling below a confidence threshold, ML model results deviating from a statistical distribution, ML model results that fall outside of a previously observed range, or any combination thereof, and the one or more training criteria comprise a predetermined time period elapsing, a predetermined amount of training data being received, a predetermined number of training data samples being received, the data falling outside of a distribution of data, or any combination thereof.

\* \* \* \* \*